United States Patent [19]
Chawla

[11] Patent Number: 5,816,317
[45] Date of Patent: Oct. 6, 1998

[54] APPARATUS FOR HEAT TRANSFER FROM DUST LADEN GASES TO FLUIDS

[75] Inventor: Jogindar Mohan Chawla, Ettlingen, Germany

[73] Assignee: Caldyn, Inc., New York, N.Y.

[21] Appl. No.: 698,808

[22] Filed: Aug. 16, 1996

Related U.S. Application Data

[60] Provisional application No. 60/003,451, Sep. 8, 1995.
[51] Int. Cl.$^6$ .............................. F28G 7/00; F28F 13/12
[52] U.S. Cl. .......................................... 165/84; 165/109.1
[58] Field of Search .......................... 165/84, 162, 109.1

[56] References Cited

U.S. PATENT DOCUMENTS

| | | | |
|---|---|---|---|
| 3,389,974 | 6/1968 | Barattini et al. | 165/84 X |
| 3,785,620 | 1/1974 | Huber . | |
| 4,036,461 | 7/1977 | Soligno | 165/162 X |
| 4,062,524 | 12/1977 | Brauner et al. . | |
| 4,570,883 | 2/1986 | Wepfer | 248/49 |
| 4,637,455 | 1/1987 | Tordonato | 165/104.16 |
| 5,238,055 | 8/1993 | Kelley | 165/84 |

OTHER PUBLICATIONS

J. K. Kwasniak, "Application of the 'Multivir' Method to Separation of Droplets and Solid Particles from Gases", Institute of Chemical Engineering, Technical University of Lodz, ul. Zwirki 36, 90–924 Lodz (Poland), pp. 211–215.

*Primary Examiner*—Allen J. Flanigan
*Attorney, Agent, or Firm*—Jaeckle Fleischmann & Mugel, LLP

[57] ABSTRACT

The present invention relates to an apparatus for heat transfer from hot particulate laden gas to a coolant fluid within a heat transfer tube. The apparatus is comprised of layers of vertically aligned strips which are offset at an angle to adjacent layers and form channels which extend through the layers. Heat transfer tubes are located in the channels formed by the vertically aligned strips. The hot particulate laden gas introduced into the apparatus is divided into a number of streams moving in two different directions by the layers of vertically aligned strips. The streams of gas cross each other spatially and thus generate vortices. The vortices force the particles away from the heat transfer tube in the center of the channel and to precipitate on the vertically aligned strips where they fall due to gravitational forces or are removed by a shaking apparatus. Heat is then drawn from the resulting substantially particulate free gas.

5 Claims, 3 Drawing Sheets

APPARATUS FOR HEAT TRANSFER FROM DUST LADEN GASES TO FLUIDS

This application claims the benefit of priority of my Provisional Application, Ser. No. 60/003,451, filed Sep. 8, 1995.

BACKGROUND OF THE INVENTION

The present invention relates to an apparatus for heat transfer from dust laden gases to fluids. Flue gases with high temperatures and with substantial dust loads are created in many industrial facilities, e.g. steel, cement, refractory, and chemical plants. The gases are usually quenched by atomization and complete evaporation of water and then led to an electrostatic precipitator or a bag filter in order to separate dust particles from the outgoing gases.

In many parts of the world there is acute power shortage where such plants are located, especially in the developing countries such as India. Therefore, particularly in these developing countries, it is desirable to use the heat content of the residual dust laden gases to produce steam for driving a turbine to generate electricity or for other applications like heating of buildings or atomization of water.

It is uneconomical to use known heat exchangers for such purposes because the dust present in the gases settles upon the heat exchanger surface areas thus contaminating the heat transfer area, thereby reducing the heat transferred to the fluid. With high dust content, the whole cross section of the flue available for gases may be choked and the cooling system would fail.

Therefore, it is an object of this invention to provide a heat exchanger with heat exchange surfaces having high intensity of heat transfer and suitable for continuous operation, regardless of the dust content of the gases.

SUMMARY OF THE INVENTION

The invention provides a heat transfer apparatus and a method for transferring heat from hot particulate laden gas to a fluid for the generation of electrical energy, heat, or both. The heat transfer apparatus comprises a plurality of adjacent layers of vertically aligned strips. The strips in each layer are spaced apart at equal intervals from each other and alternate layers of strips are offset at an angle to each other. This arrangement creates channels which extend between the layers of strips. Within these channels a plurality of heat transfer tubes which contain a coolant liquid can be placed vertically.

Hot particulate laden gas, flowing horizontally, is introduced into a flue containing the heat transfer apparatus. The hot particulate laden gas is divided into a plurality of gas streams by the alternate layers of strips so that the resulting gas streams flow in two different directions. The gas streams in one direction intersect the gas streams flowing in the second direction, thereby creating vortices. These vortices force the particles in the gas away from the center of the channel (where the heat transfer tube is located) where they precipitate onto the vertically aligned strips that form the channel walls or fall due to gravitational forces. The gas surrounding the heat transfer tube is now substantially free of particles, so the coolant liquid removes the heat from the gas and converts the heat into electrical energy, room heat, or both. In addition, the particles now precipitated on the vertically aligned strips will fall due to gravitational forces or can be removed by the addition of a shaking apparatus attached to the layers of strips which periodically can shake the layers.

DETAILED DESCRIPTION OF THE INVENTION

Figure 1:
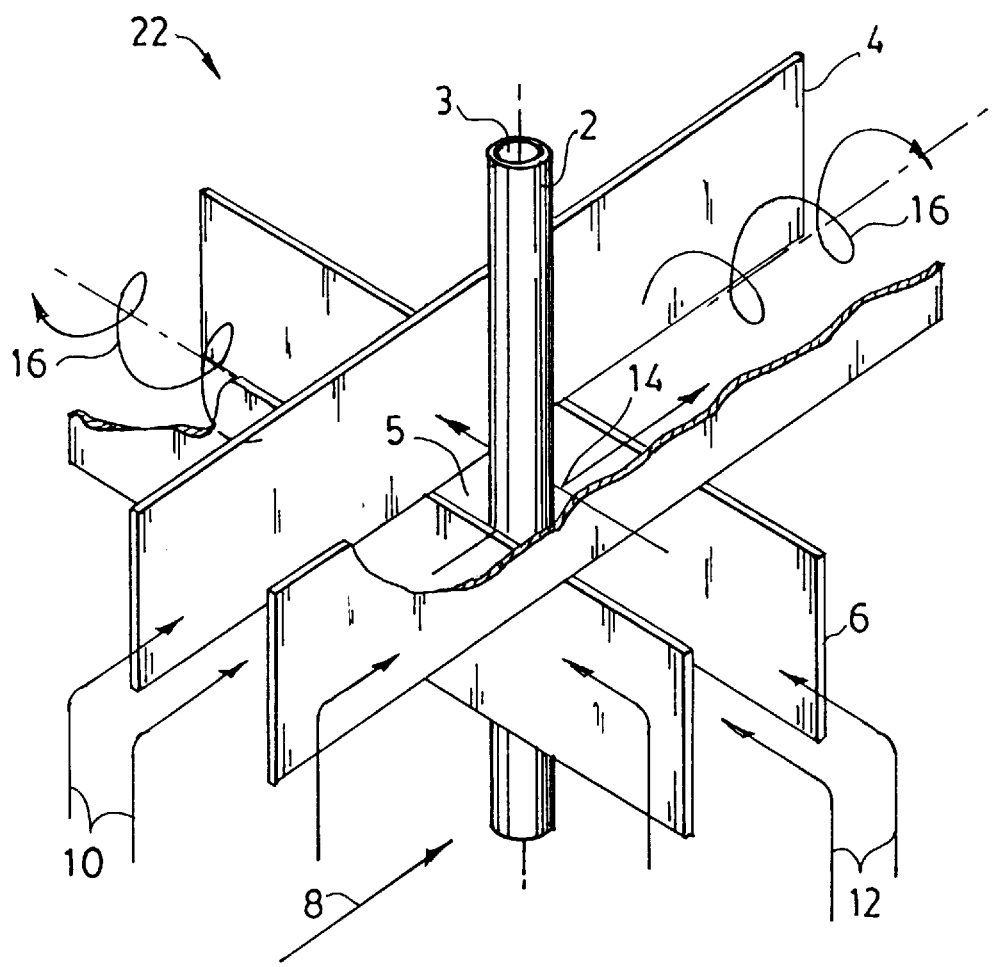
FIG. 1 illustrates a partial broken away perspective view of adjacent layers of vertically aligned strips which form a channel in which a vertical heat transfer tube is placed.

FIG. 1 depicts a vertical heat transfer tube 2 which is located within a channel 5 formed by layers of vertically aligned strips 4 and 6. A coolant liquid 3 passes through heat transfer tube 2 to remove heat from the gases surrounding the heat transfer tube 2. The layers of vertically aligned strips 4 and 6 are part of a packing structure (FIG. 2) and are offset at an angle relative to adjacent layers. Horizontally flowing particulate laden gas 8 encounters the vertically aligned strips 4 and 6 which force the gas into gas streams 10 and 12. Gas streams 10 and 12 are directed in two different directions and intersect 14 towards the center of the channel 5. The intersecting gas streams 14 induce rotational motion in each other to create vortices 16 of particulate laden gas. The vortices 16 force the particles in the gas away from the heat transfer tube 2 in the center of the channel 5 towards the vertically aligned strips 4 and 6. The particles in the gas either precipitate onto the vertically aligned strips 4 and 6 and then fall from the strips 4 and 6 due to gravitational forces or simply fall due to gravity. Therefore, the heat transfer tubes are kept constantly free of dust by the vortices 16. Moreover, the heat transfer is enhanced by the turbulent rotary motion of the vortices 16.

Figure 2:
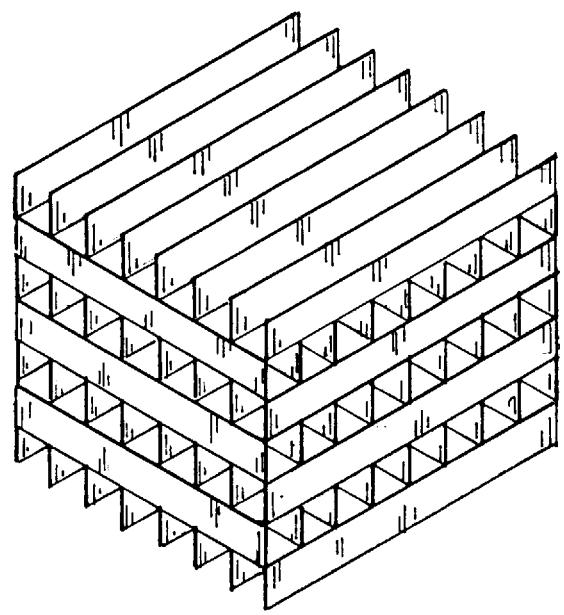
FIG. 2 illustrates the general packing arrangement of the heat transfer apparatus.

FIG. 2 depicts a typical packing structure of a heat transfer apparatus 22 made in accordance with the present invention. It shows how multiple channels are created by the alternate layers of strips, where the strips in each layer are disposed at an angle to the strips in the adjacent layers. The packing structure is similar to the Multivir packing shown and described in Chemical Eng. Process, 24 (1988) 211–215 and incorporated herein by reference. The Multivir packing structure in its rectangular embodiment comprises adjacent layers of straight strips spaced uniformly, wherein alternate layers of the strips are of opposite inclination. Within the layers of strips a system of passages or channels of rectangular cross-section is formed in which narrow gas streams flow and come into contact with each other thereby inducing rotational motion. The centrifugal force of the spinning gas streams forces particles in the gas to separate and settle on the strips of packing or to fall due to gravity. In its annular embodiment, the Multivir packing structure consists of adjacent layers of strips of equal width, wherein the strips are spaced at equal distances from each other between two concentric cylindrical surfaces of different radii and are aligned so that the strip width is parallel to the packing axis. The strips form involuted surfaces for ⅘ of the length of the strips and the remaining ⅕ of the length of the strips are bent so as to form cylindrical surfaces. Strips in adjacent layers are bent in opposite directions. The annular Multivir packing similarly produces a system of passages in which narrow gas streams flow, inducing rotational motion in each other and thereby separating particles from a gas stream.

Figure 3:
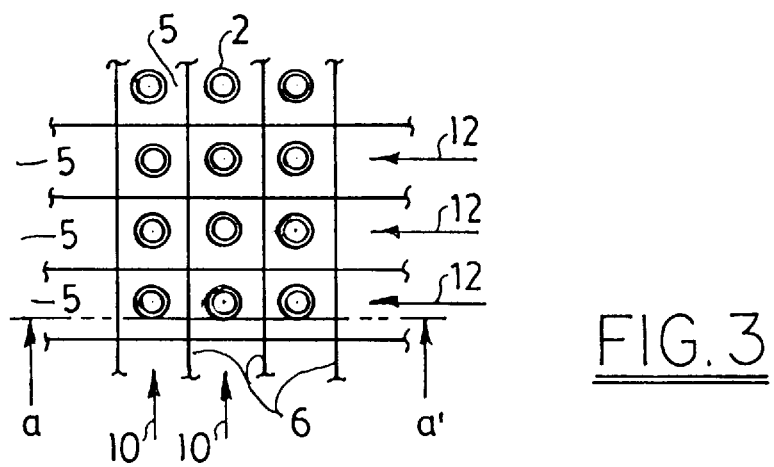
FIG. 3 is a cross sectional plane view of the channels formed by the strips in which heat transfer tubes are located.

FIG. 3 shows a cross sectional view of the layers of vertically aligned strips 4 and 6 in which heat transfer tubes 2 are located. The diameter of the heat transfer tubes 2 is small enough as compared with the dimensions of the channel 5 so that the vortices 16 are not suppressed.

Figure 4:
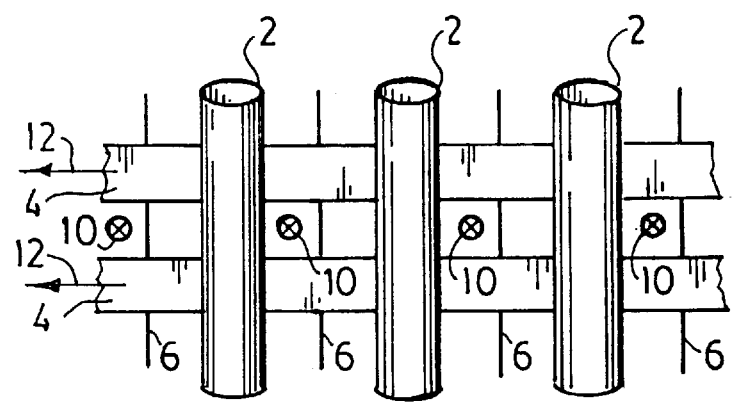
FIG. 4 is a cross sectional view along line a–a' of FIG. 3.

FIG. 4 shows a cross sectional view along line a–a' of FIG. 3. Note substreams 12 flow right to left and substreams 10 flow into the figure.

Figure 5:
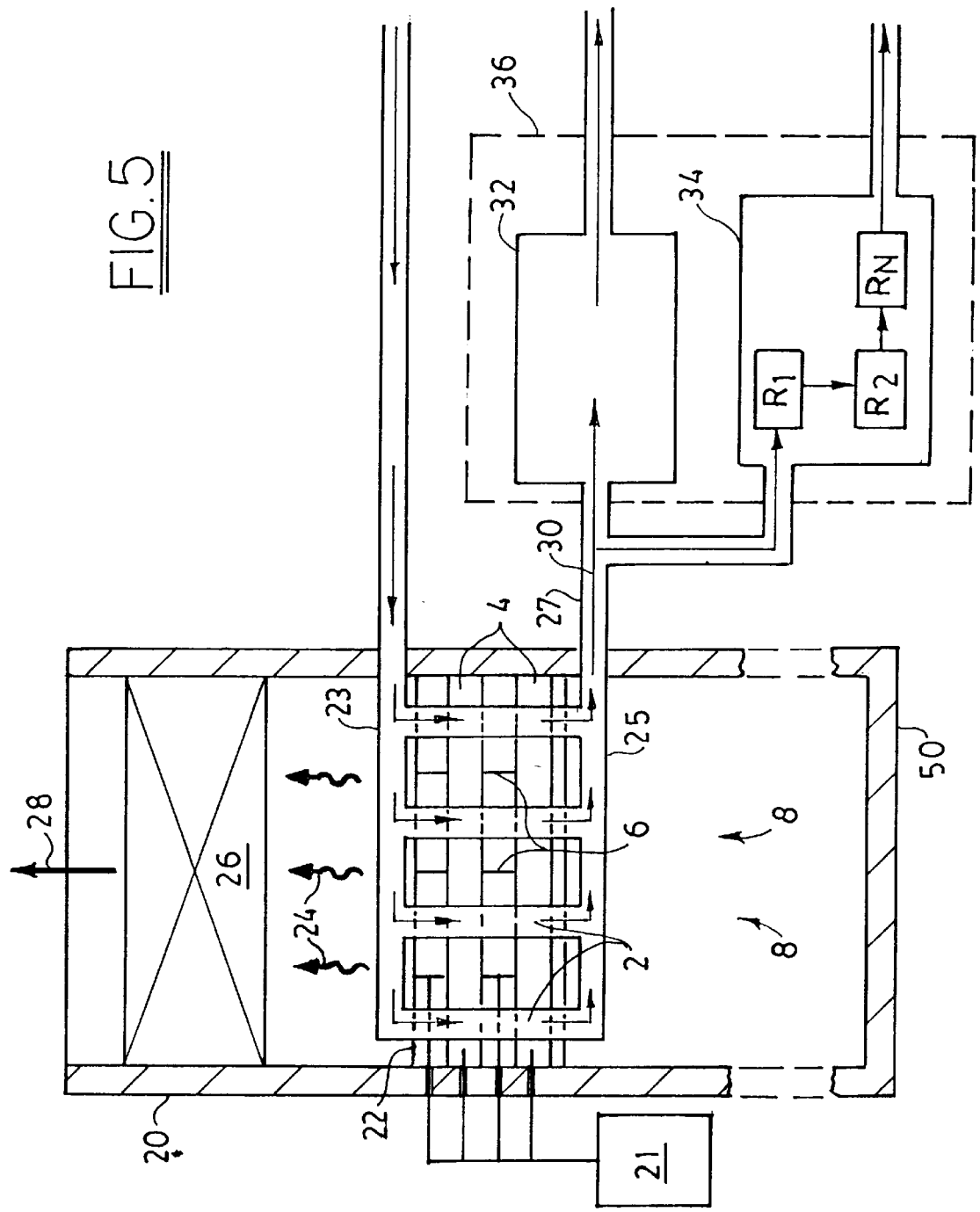
FIG. 5 is a schematic view of a flue containing the heat transfer apparatus of the present invention.

FIG. 5 is a schematic view of a flue 20 containing the heat transfer apparatus 22 of the present invention. Hot particulate laden gas 8 from an industrial facility (e.g. a cement or steel plant) is introduced into the flue 20 wherein it encounters the heat transfer apparatus 22 containing one or more pairs of vertically aligned strips 4 and 6 which form channels 5 in which heat transfer tubes 2 are located. Suitable ducts (not shown) divide the gas 8 into one or more sets of first and second substreams 10, 12. Each substream 10 flows transverse to each substream 12. Where there are multiple layers of strips 4 and 6, one substream flowing in one layer is adjacent to substreams in the superior and inferior layers that flow in a direction transverse to the substream in the middle. The hot particulate laden gas 8 travels through the heat transfer apparatus 22 where the particles are substantially removed. Some particles fall and collect on a base 50. Other particles collect on the vertically aligned strips 4 and 6. The heat from the gas is transferred to the coolant fluid 3 within the heat transfer tubes 2. The coolant fluid 3 is fed into the heat transfer apparatus 22 via a feed line or manifold 23. The fluid 3 passes from the input manifold 23 into one end of each of a plurality of heat transfer tubes 2. The other end of each heat transfer tube is connected to an output manifold 25. Those skilled in the art understand that the position of the input manifold 23 and the output manifold 25 may be reversed so that the coolant 3 entering the apparatus 22 enters from beneath the apparatus 22 and the coolant containing the transferred heat 30 exits from above the apparatus 22. The output manifold 25 is coupled to an output feed line 27. The output feed line is coupled to a heat reclamation apparatus 36. The heat reclamation apparatus 36 is comprised of a suitable apparatus for generating electricity 32 and/or a heat distribution network 34 having one or more rooms $R_1$, $R_2$ . . . $R_n$. The coolant fluid containing the transferred heat 30 is transported to generator 32 which converts the heat absorbed by the fluid into electrical energy, and/or to a head distribution system that distributes heat to one or rooms, $R_1$, $R_2$, . . . $R_n$. Those skilled in the art understand that the heat may be distributed in any suitable form such as hot water, hot air, or steam. A shaking apparatus 21 is attached to the vertically aligned strips 4 and 6 to assist in removal of precipitated particles. The shaking apparatus has a vibrator mechanism coupled to the strips 4 and 6. The shaking apparatus is selectively operated to vibrate the strips 4, 6 and release the deposited particles. The released particles are collected in base 50.

After passing through the heat transfer apparatus 22 the resulting gas 24 is substantially free of particles. The substantially particle free gas 24 can then be directed into an electrostatic-precipitator 26 for removal of the remaining particles. Those skilled in the art understand that this will substantially reduce the dust load to the electrostatic-precipitator, thereby increasing its efficiency. After passing through the electrostatic-precipitator 26 the resulting gas 28 is cool and particle free as it leaves the flue 20. Those skilled in the art understand that other filtering means may replace the electrostatic-precipitator.

In its preferred embodiment, the invention has no moving parts since particles such as dust frequently interfere with the operation of moving parts.

While the foregoing embodiments show several ways of implementing the invention, those skilled in the art will appreciate that further modifications, additions, deletions, and changes made be made without departing from the spirit and scope of the invention as set forth in the following claims.

I claim:

1. A heat transfer apparatus for transferring heat from a particulate laden hot gas to a fluid comprising:

a) a plurality of adjacent layers of vertically aligned strips, wherein the strips in each layer are spaced apart at equal intervals from each other and alternate layers of strips are offset at an angle to each other, thereby forming channels extending between the layers of strips said channels generating vortices of said hot gas moving through said channels; and b) one or more vertical heat transfer tubes containing a coolant fluid, wherein each tube has a diameter smaller than said space between said strips, is located within the channel formed by the layers of strips and is spaced from and not in contact with said strips to not suppress any vortices of said hot gas.

2. The apparatus of claim 1, further comprising a means for shaking the layers of vertically aligned strips to remove particles precipitated on the strips.

3. The apparatus of claim 1, wherein a plurality of heat transfer tubes containing coolant fluid are located within the channels formed by the layers of strips.

4. The apparatus of claim 1, further comprising a means for converting the heat removed by the coolant into electricity.

5. The apparatus of claim 1, further comprising a means for distributing the heat removed by the coolant to one or more rooms.

* * * * *